(12) United States Patent
Brants et al.

(10) Patent No.: US 8,332,207 B2
(45) Date of Patent: Dec. 11, 2012

(54) LARGE LANGUAGE MODELS IN MACHINE TRANSLATION

(75) Inventors: Thorsten Brants, Palo Alto, CA (US); Ashok C. Popat, Menlo Park, CA (US); Peng Xu, San Jose, CA (US); Franz J. Och, Mountain View, CA (US); Jeffrey Dean, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 995 days.

(21) Appl. No.: 11/767,436

(22) Filed: Jun. 22, 2007

(65) Prior Publication Data

US 2008/0243481 A1    Oct. 2, 2008

Related U.S. Application Data

(60) Provisional application No. 60/920,283, filed on Mar. 26, 2007.

(51) Int. Cl.
*G06F 17/27* (2006.01)

(52) U.S. Cl. ............ 704/9; 704/257; 704/255; 704/251; 704/240; 704/2; 704/10; 704/1; 370/270

(58) Field of Classification Search ............... 704/1, 10, 704/240, 257, 255, 251, 2; 707/999.102; 370/270
See application file for complete search history.

(56) References Cited

U.S. PATENT DOCUMENTS

| | | | |
|---|---|---|---|
| 6,167,369 A * | 12/2000 | Schulze | 704/9 |
| 6,167,398 A * | 12/2000 | Wyard et al. | 1/1 |
| 6,314,399 B1 * | 11/2001 | Deligne et al. | 704/257 |
| 7,197,457 B2 * | 3/2007 | Weng et al. | 704/255 |
| 7,406,416 B2 * | 7/2008 | Chelba et al. | 704/240 |
| 7,565,372 B2 * | 7/2009 | Zhang et al. | 1/1 |
| 7,593,843 B2 * | 9/2009 | Aue et al. | 704/2 |
| 7,711,545 B2 * | 5/2010 | Koehn | 704/5 |
| 2002/0077823 A1 * | 6/2002 | Fox et al. | 704/260 |
| 2003/0191625 A1 * | 10/2003 | Gorin et al. | 704/1 |
| 2004/0220809 A1 * | 11/2004 | Wang et al. | 704/257 |

(Continued)

FOREIGN PATENT DOCUMENTS

CN    1673997 A    9/2005

OTHER PUBLICATIONS

International Search Report and Written Opinion from corresponding International Application No. PCT/US2008/058116 dated Sep. 12, 2008.

(Continued)

*Primary Examiner* — Michael Colucci
(74) *Attorney, Agent, or Firm* — Harness, Dickey & Pierce, P.L.C.

(57) ABSTRACT

Systems, methods, and computer program products for machine translation are provided. In some implementations a system is provided. The system includes a language model including a collection of n-grams from a corpus, each n-gram having a corresponding relative frequency in the corpus and an order n corresponding to a number of tokens in the n-gram, each n-gram corresponding to a backoff n-gram having an order of n-1 and a collection of backoff scores, each backoff score associated with an n-gram, the backoff score determined as a function of a backoff factor and a relative frequency of a corresponding backoff n-gram in the corpus.

23 Claims, 4 Drawing Sheets

U.S. PATENT DOCUMENTS

| | | | |
|---|---|---|---|
| 2005/0096907 A1* | 5/2005 | Bacchiani et al. | 704/257 |
| 2005/0276235 A1* | 12/2005 | Lee et al. | 370/270 |
| 2006/0116997 A1* | 6/2006 | Yu et al. | 707/4 |
| 2007/0078653 A1* | 4/2007 | Olsen | 704/240 |
| 2008/0040114 A1* | 2/2008 | Zhou et al. | 704/257 |
| 2008/0059187 A1* | 3/2008 | Roitblat et al. | 704/257 |
| 2008/0082485 A1* | 4/2008 | Church et al. | 707/3 |
| 2008/0154600 A1* | 6/2008 | Tian et al. | 704/251 |
| 2008/0162117 A1* | 7/2008 | Bangalore et al. | 704/10 |
| 2009/0171662 A1* | 7/2009 | Huang et al. | 704/251 |
| 2010/0004930 A1* | 1/2010 | Strope et al. | 704/240 |

OTHER PUBLICATIONS

Katz, S.M., "Estimation of Probabilities from Sparse Data for the Language Model Component of a Speech Recognizer", IEEE Transactions on Acoustics, Speech and Signal Processing, IEEE Inc. New York, USA, vol. ASSP-35, No. 3, Mar. 1, 1987, pp. 400-401.

Kneser et al., "Improved Backing-Off for M-GRAM Language Modeling", Acoustics, Speech, and Signal Processing, 1995. ICASSP-95., 1995 Inter National Conference on Detroit, MI, USA May 9-12, 1995, New York, NY, USA, IEEE, US, vol. 1, May 9, 1995, pp. 181-184, XPO10625199, ISBN: 978-0-7803-2431-2 sections 1-4, abstract.

Brants et al., "Large Language Models in Machine Translation" Proceedings of the 2007 Joint Conference on Empirical Methods in Natural Language Processing and Computational Natural Language Learning, [Online], Jun. 28-30, 2007, pp. 858-867, XP002503558 Prague, CZ, Retrieved from the Internet: URL:http://acl.ldc.upenn.edu/D/D07/DO7-109 O.pdf> [retrieved on Nov. 12, 2008], the whole document.

Zhang et al., "Distributed Language Modeling for N-best List Re-ranking", Proceedings of the 2006 Conference on Empirical Methods in Natural Language Processing, [Online], Jul. 22-23, 2006, page 216-223, XP002503559 Sydney, Australia Retrieved from the Internet: URL:http://www.aclweb.org/anthology-new/W/ W06/W06-1626.pdf> [retrieved on Nov. 12, 2008] sections 1-4, abstract.

Dean et al., "MapReduce: Simplified Data Processing on Large Clusters", OSDI'04: Sixth Symposium on Operating System Design and Implementation, [Online] Dec. 6-8, 2004, XP002503560, San Francisco, CA, USA Retrieved from the Internet: URL:http://labs.google.com/papers/mapreduc e-osd104.pdf> [retrieved on Nov. 11, 2008] the whole document.

Placeway, et al., "The Estimation of Powerful Language Models From Small and Large Corpora", Plenary, Special, Audio, Underwater Acoustics, VLSI, Neural Networks. Minneapolis, Apr. 27-30, 1993; [Proceedings of the International Conference on Acoustics, Speech, and Signal Processing (ICASSP)], New York, IEEE, US, vol. 2, Apr. 27, 1993, pp. 33-36, XP010110386, ISBN: 978-0-7803-0946-3 pp. 33-36.

Goodman, "A bit of progress in language modeling", Computer Speech and Language, Elsevier, London, GB, vol. 15, No. 4, Oct. 1, 2001, pp. 403-434, XP004418713, ISSN: 0885-2308 sections 1-3 abstract.

Xiaoyong, "Estimating Language Models Using Hadoop and Hbase", Master of Science Thesis in Artificial Intelligence, [Online] 2008, XP002503561 School of Informatics, University of Edinburgh, Scotland, UK, Retrieved from the Internet: URL:http://www.iccs.inf.ed.ac.uk/imiles/ms_ c-projects/yu.pdf>, [retrieved on Nov. 12, 2008] sections 1, 2, 3, & 6 abstract.

First Office Action issued Aug. 17, 2011 from related Chinese Patent Application No. 200880016830.6, 8 pages.

* cited by examiner

LARGE LANGUAGE MODELS IN MACHINE TRANSLATION

CROSS-REFERENCE TO RELATED APPLICATIONS

This application claims the benefit under 35 U.S.C. §119 (e) of U.S. Patent Application No. 60/920,283, entitled Large Language Models in Machine Translation, to Thorsten Brants, Ashok C. Popat, Peng Xu, Franz J. Och, and Jeffrey Dean, which was filed on Mar. 26, 2007. The disclosure of the above application is incorporated herein by reference in its entirety.

BACKGROUND

This specification relates to statistical machine translation.

Manual translation of text by a human operator can be time consuming and costly. One goal of machine translation is to automatically translate text in a source language to corresponding text in a target language. There are several different approaches to machine translation including example-based machine translation and statistical machine translation. Statistical machine translation attempts to identify a most probable translation in a target language given a particular input in a source language. For example, when translating a sentence from French to English, statistical machine translation identifies the most probable English sentence given the French sentence. This maximum likelihood translation can be written as:

$$\mathop{\mathrm{argmax}}_{e} P(e \mid f)$$

which describes the English sentence, e, out of all possible sentences, that provides the highest value for P(e|f). Additionally, Bayes Rule provides that:

$$P(e \mid f) = \frac{P(e)P(f \mid e)}{P(f)}.$$

Using Bayes Rule, this most likely sentence can be re-written as:

$$\mathop{\mathrm{argmax}}_{e} P(e \mid f) = \mathop{\mathrm{argmax}}_{e} P(e)P(f \mid e).$$

Consequently, the most likely e (i.e., the most likely English translation) is one that maximizes the product of the probability that e occurs and the probability that e would be translated into f (i.e., the probability that a given English sentence would be translated into the French sentence).

SUMMARY

Systems, methods, and computer program products for machine translation are provided. In general, in one aspect, a system is provided. The system includes a language model including a collection of n-grams from a corpus, each n-gram having a corresponding relative frequency in the corpus and an order n corresponding to a number of tokens in the n-gram, each n-gram corresponding to a backoff n-gram having an order of n-1 and a collection of backoff scores, each backoff score associated with an n-gram, the backoff score determined as a function of a backoff factor and a relative frequency of a corresponding backoff n-gram in the corpus. Other embodiments of this aspect include corresponding systems, apparatus, computer program products, and computer readable media.

In general, in one aspect, a method is provided. The method includes generating a language model, including identifying a collection of n-grams from a corpus of training data, each n-gram of the collection having a corresponding relative frequency of occurring in the corpus and an order n corresponding to a number of tokens in the n-gram, each n-gram corresponding to a backoff n-gram having an order of n-1 and identifying one or more backoff factors, where the backoff factors are used to identify a backoff score for one or more n-grams as a function of a relative frequency of a backoff n-gram. Other embodiments of this aspect include methods, apparatus, computer program products, and computer readable media.

In general, in another aspect, a method is provided. The method includes receiving an input string having a plurality of tokens, the input string being divided into one or more n-grams, each n-gram having an order, the order identifying a number of tokens in the n-gram and using a language model to identify a probability for each n-gram in the input string. When a first n-gram in the input string is not found in the language model, identifying a backoff n-gram, the backoff n-gram having an order that is one less than the order of the first n-gram, and when the backoff n-gram is found in the language model and identifying a backoff score for the first n-gram, the backoff score being a function of a backoff factor and a relative frequency of the backoff n-gram in the language model. Other embodiments of this aspect include corresponding systems, apparatus, computer program products, and computer readable media.

Particular embodiments of the subject matter described in this specification can be implemented to realize one or more of the following advantages. A backoff for an n-gram can be determined directly as a function of relative frequency without calculating normalized probabilities for a backoff n-gram. Language models can be generated in a distributed environment where n-gram backoff values for particular n-grams can be generated on a same shard.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
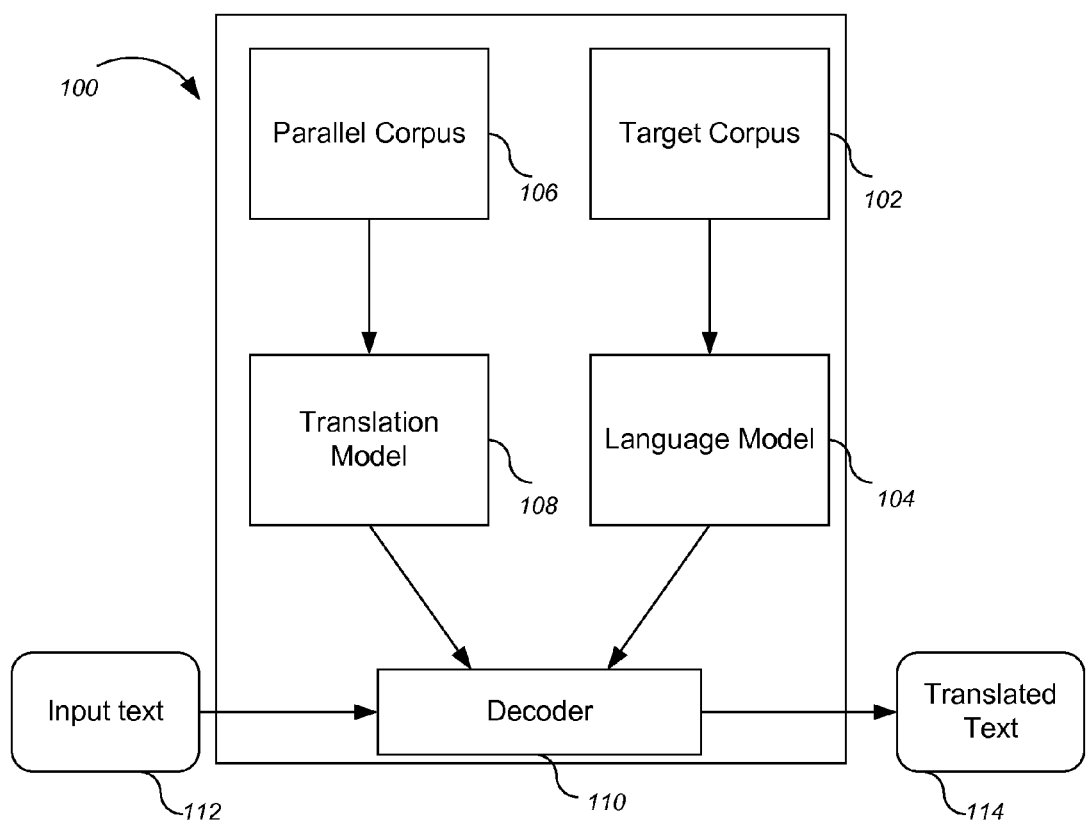
FIG. 1 is a block diagram of an example machine translation system.

FIG. 1 is a block diagram of an example machine translation system 100. Machine translation system includes a target corpus 102, a language model 104, a parallel corpus 106, a translation model 108, and a decoder 110. Providing input text 112 to the translation system 100 produces translated text 114.

The target corpus 102 provides a collection of text in a target language (e.g., English), which is used to train the language model 104. The target corpus 102 can include a number of different sources of text, including, e.g., web pages and news articles. In some implementations, the target corpus 102 includes text on the order of tens to hundreds of billions of words, or even more. One such corpus is the Linguistic Data Consortium ("LDC") Web 1T 5-gram Version 1 corpus, LDC Catalog No.: DC2006T13, ISBN: 1-58563-397-6, contributed by Google Inc. This corpus uses approximately one trillion tokens (including individual words, punctuation, and markers identifying a beginning and end of individual sentences) of text from publicly accessible Web pages.

The language model 104 identifies the probability that a particular string (e.g., a phrase, sentence, or collection of sentences) in the source language occurs. Thus, for English, the language model 104 identifies the probability that a particular string in English occurs. To identify the probability of a particular string occurring, the language model 104 calculates the number of times the string occurs in the target corpus 102 divided by the total number of string in the target corpus 102. For example, if the phrase "The red wheelbarrow" occurs 53,000 times in a corpus of 100,000,000 words, the probability equals:

$$P(\text{The red wheelbarrow}) = \frac{53,000}{100,000,000} = 0.00053.$$

However, a number of possible strings will have a probability of zero since they are not found within the target corpus 102. Therefore, in some implementations, the probability of a particular string is calculated as a function of the probabilities of sub-string components. One technique for representing sub-strings is by using n-grams. An n-gram is a sequence of n consecutive tokens. An n-gram has an order, which is the number of tokens in the n-gram. For example, a 1-gram (or unigram) includes one token; a 2-gram (or bigram) includes two tokens.

An n-gram language model uses n-gram sub-strings to calculate the probability o a string. The probability of a given string can be calculated as a product of n-gram conditional probabilities. The conditional probability for a bigram, represented $P(y|x)$, is the probability that word y follows word x. The conditional probabilities are generally determined empirically, according to relative frequencies in the target corpus 102. In the example above, the probability of the word y given x is given by:

$$P(y|x) = \frac{f(xy)}{f(x)},$$

where f(xy) is a frequency or a count of the occurrences of the string "xy" in the target corpus 102.

The probability for the string can be determined as a product of conditional probabilities. For example, to calculate P(The red wheelbarrow) for the sentence beginning with the phrase "The red wheelbarrow" using a bigram language model, the n-gram language model calculates:

$$P(\text{The}|\text{<start>})P(\text{red}|\text{The})P(\text{wheelbarrow}|\text{red}),$$

where <start> represents the beginning of a sentence such that P(The |<start>) represents the probability that a sentence begins with "The".

This string probability can be generalized to:

$$P(e_1, \ldots, e_k) = \prod_{i=1}^{k} P(e_i | e_{i-n+1}, \ldots, e_{i-1})$$

where $(e_1, \ldots, e_k)$ represent tokens in the string and n is the order of the largest n-gram allowed in the language model.

The parallel corpus 106 includes a collection of text in the source language (e.g., English) and a corresponding translation in one or more target languages (e.g., French). The parallel corpus 106 can include a number of different sources of text, including, e.g., web page and news article pairs where each pair includes text in the source language and the corresponding translated text in the target language. In another example, the parallel corpus 106 can include multi-lingual data. For example, United Nations proceedings are available, which provide parallel translations in six languages.

The translation model 108 identifies the conditional probability of a particular target language string given a particular source string. Thus, for an English source language and a French target language, the translation model 108 identifies the probability P(f|e) of a French string f given an English string e. Translation models can be generated in a number of different ways. In some implementations, a number of parameters are estimated in order to determine P(f|e). For example, a translation model can be defined according to four parameters: t, n, d, and p (e.g., IBM Model 3 described, for example, P. F. Brown, V. J. Della Pietra, S. A. Della Pietra, and R. L. Mercer, *The Mathematics of Statistical Machine Translation: Parameter Estimation*, Computational Linguistics 19(2), 1993, which is incorporated by reference).

A translation parameter, t, provides a probability of producing a translated word from a source word, e.g., t(bonjour|hello). A fertility parameter, n, provides a probability that source word will produce n target words. For example, n(2|hello) represents the probability that the source word "hello" will produce exactly two French words. A distortion parameter, d, provides a probability associated with the position of a target word in a target sentence relative to the position of the corresponding source word in a source sentence. For example, d(3|5) represents the probability that the English word in position 5 of a sentence (e.g., the fifth word) will provide a French word in position 3 of a translated French sentence (e.g., the third word). Additionally, a parameter p provides a probability of the translation including a spurious word. A spurious word is a word that appears in the target language translation of a source language string that does not correspond to a source word in the source string.

The values of the model parameters can be estimated directly if the words in the source and target sentence pairs are all aligned. The term "alignment" will be used to refer to a data structure that represents a word-for-word connection between source and target words (e.g., that "hello" in one sentence aligns with "bonjour") in a pair of sentences. In some implementations, the alignment is simply a vector identifying positions of source words that various target words connect to. If the alignment is known, the parameter values can be estimated.

There can be more than one possible alignment. For example, a sentence pair could have two equally likely alignments. Consequently, a probability can be calculated for a particular alignment. The alignment probability defines the likelihood that words are aligned in a particular way. The probability of a particular alignment given a particular sentence pair can be written P(a|e, f), where:

$$P(a \mid e, f) = \frac{P(a, f \mid e)}{P(f \mid e)},$$

where, $$P(f \mid e) = \sum_{a} P(a, f \mid e),$$

and where the P(a, f|e) is summed over all alignments a and represents the joint probability of an alignment and a source sentence, given a target sentence. Alignment, α, is represented by a single letter; however, it represents a matrix whose dimension can vary. Specifically, α is a matrix random variable, a specific value of which refers to a matrix of associations (e.g., links) between a specific source sentence and a specific paired target sentence. Columns correspond to source word position and rows to target word positions. An additional row and column may be labeled with the null word, in cases where there is no correspondence. The elements in the matrix are zeroes and ones, indicating the presence or absence of an association between the corresponding source and target sentence words. Depending on the alignment model used, constraints may be imposed on where in the matrix links can occur (e.g., whether a source word can map to multiple target words, whether words can map to a null word, etc.) Therefore, P(a|e, f) can be described in terms of P(a, f|e). However, P(a, f|e) can also be described as a function of the parameter values. Thus, if the parameter values are known, the alignment probabilities can be directly calculated.

A particular alignment α a refers to a specific alignment between a specific (f, e) pair, while P(a|e, f) is the posterior probability over possible alignments, again for the specific (f, e) pair. P(a|e, f) is described by parameters which can be estimated by some training procedure that iteratively learns the parameters by looping over a large number of (f, e) sentence pairs, using the current parameter values to achieve a better word alignment between each pair than was achieved in the previous iteration, then using that alignment to update the parameter values, then repeating. Additional details on alignment can be found, for example, in Franz Joseph Och and Hermann Ney, *A Systematic Comparison of Various Statistical Alignment Models*, Computational Linguistics, 29(1): 9-51, Mar. 2003, which is incorporated by reference.

Consequently, to calculate P(f|e), the translation system calculates P(a, f|e). However, to calculate P (a, f|e), the parameter values are needed. Additionally, to get the parameter values, the system needs P(a|e, f), but to do that P(a, f|e) is again needed. Thus, a technique is used to solve for both parameter values and alignment probabilities substantially simultaneously.

An expectation-maximization ("EM") algorithm can be used to estimate parameter values and alignment probabilities using an iterative process until local optimum values are determined. An EM algorithm calculates maximum likelihood estimates of variables in probabilistic models. An EM algorithm is a two-step process. An expectation step calculates an expectation of the likelihood by including the variable values as if they were observed. A maximization step calculates the maximum likelihood estimates by maximizing the expected likelihood calculated in the expectation step. The process iterates between expectation and maximization steps where the values for the variable calculated in the maximization step are used for a next expectation step. The term "EM algorithm" refers to a class of related algorithms: the expectation and maximization steps provide a roadmap for developing specific EM algorithms. In some implementations, other techniques are used to find maximum likelihood estimates other than the EM algorithm, for example, gradient descent or conjugate gradient techniques.

Using a technique such as an EM algorithm, the translation model 108 is trained to determine a most likely parameter values and alignment probability for a give source and target language.

The decoder 110 applies the language model 104 and the translation model 108 to a given string (e.g., from input text 112) in order to produce a translated string (e.g., as translated text 114). In particular, the decoder 110 translates an observed sentence, f, (e.g., a French sentence) by seeking the sentence, e, (e.g., an English sentence) that maximizes the product of P(e) determined by the language model 104 and P(f|e) determined by the translation model 108.

Figure 2:
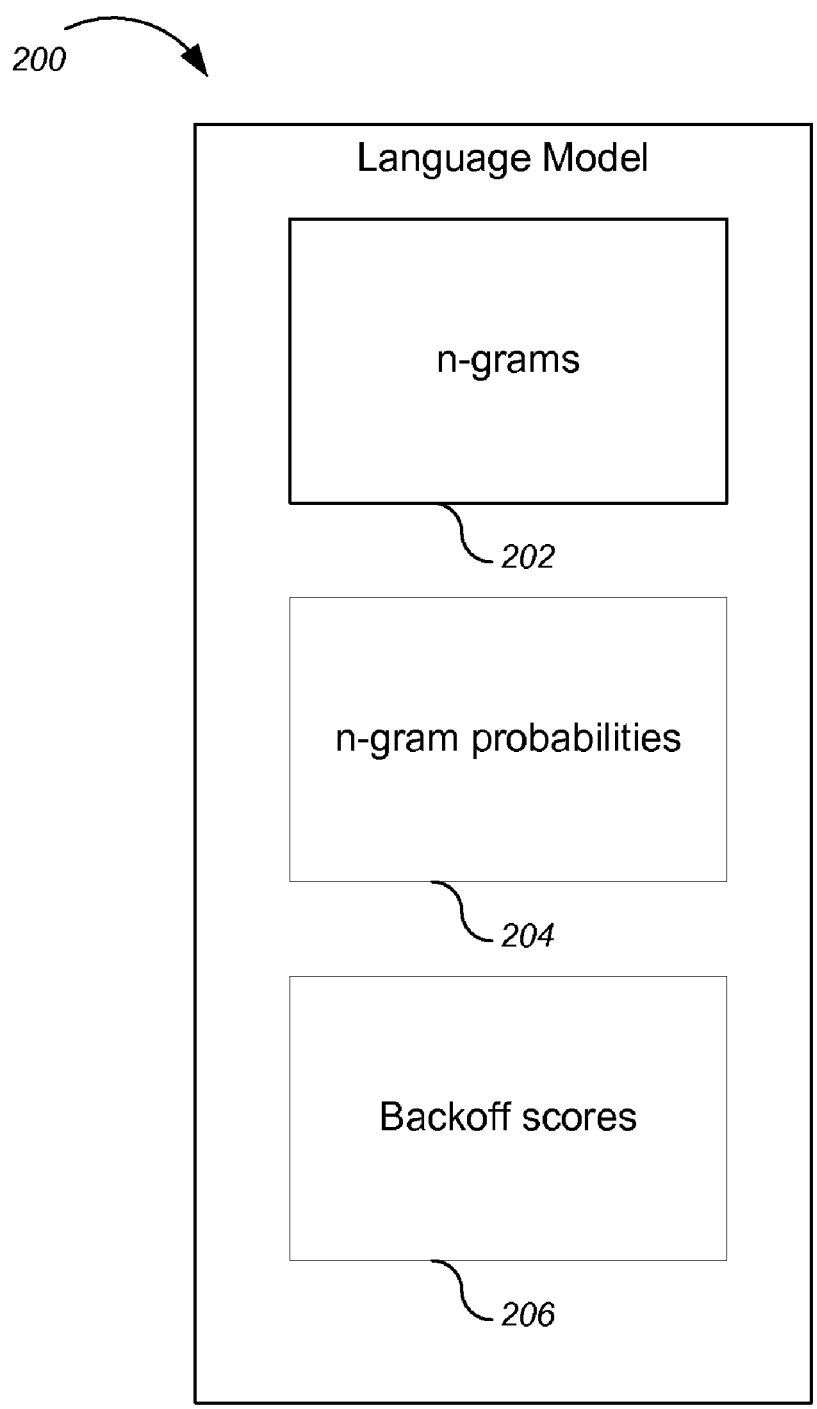
FIG. 2 is a block diagram of an example language model.

FIG. 2 is a block diagram of an example language model 200. The language model 200 includes n-grams 202, n-gram probabilities 204, and backoff scores 206. The n-grams 202 are derived from training data, for example, from target corpus 102. The n-grams 202 include n-grams of each order for the particular language model 200. For example, for a 5-gram language model, the n-grams 202 include 5-grams, 4-grams, 3-grams, 2-grams, and 1-grams derived from the training data. In some implementations, the n-gram represents a string of n consecutive tokens, where a token can include punctuation and other information, e.g., an identifier of a start of a sentence.

The n-gram probabilities 204 are probability estimates calculated as a function of n-gram relative frequency in the training data. For example, a string of L tokens can be represented as $w_1^L = (w_1, w_2, \ldots, w_L)$. A probability can be assigned to the string $w_1^L$ as:

$$P(w_1^L) = \prod_{i=1}^{L} P(w_i \mid w_1^{i-1}) \approx \prod_{i=1}^{L} \hat{P}(w_i \mid w_{i-n+1}^{i-1}),$$

where the approximation is based on a Markov assumption that only the most recent (n-1) tokens are relevant when predicting a next word in the string, and the "^" notation for P indicates that it is an approximation of the probability function.

For any substring (e.g., a particular n-gram), denoted $w_i^j$, of the sting $w_i^L$, a frequency, $f(w_i^j)$, can be calculated. The frequency of the substring denotes the frequency of occurrence of that substring in the training data, which can be considered a long fixed sample string. The maximum-likelihood probability estimates for the n-grams are given by their relative frequencies. The relative frequencies, r, for each n-gram can be determined as:

$$r(w_i \mid w_{i-n+1}^{j-1}) = \frac{f(w_{i-n+1}^{j})}{f(w_{i-n+1}^{j-1})}.$$

The relative frequency of an n-gram is the frequency of the n-gram divided by the frequency of the (n-1) gram. The probability estimates for each n-gram in the training data can be calculated and stored for each n-gram as n-gram probabilities 204 in the language model 200.

The relative frequency can be zero or undefined for particular n-grams if they are not found in the training data. As a result, the corresponding probability estimates can be inaccurate or undefined. This is referred to as a sparse data problem. Additionally, the use of higher order n-grams, while potentially increasing language model accuracy, exacerbates the sparse data problem. As a result, smoothing techniques are used to account for missing n-grams.

The smoothing can be provided by backoff scores 206. The back-off scores 206 can be used to ensure that there is always a non-zero probability for a given n-gram. Generally, the backoff considers whether some part of the n-gram occurs. For example, if the trigram "xyz" is not found, smoothing is performed to identify whether a backoff n-gram "yz" occurs. If "yz" does not occur, the smoothing can recursively identify whether "z" occurs.

In some implementations, the backoff scores 206 are calculated directly as a function of the relative frequencies of the n-grams. Consequently, the probability for a given n-gram, $P(w_i|w_{i-k+1}^{i-1})$ can be represented as the relative frequency of the n-gram when the n-gram exists. Thus, when the n-gram frequency is greater than zero, $f(w_{i-k+1}^{i})>0$, the probability estimate is simply the relative frequency:

$$\frac{f(w_{i-k+1}^{i})}{f(w_{i-k+1}^{i-1})}.$$

However, when the n-gram frequency is not greater than zero, a backoff score is calculated as:

$$\alpha S(w_i|w_{i-k+2}^{i-1}),$$

where α is a backoff factor and S is used to indicate that the calculations are scores not probabilities, since they are directly calculated using the relative frequencies of the n-grams. Essentially, the backoff factor applies a penalty to the relative frequency of the backoff n-gram (e.g., to compensate for the n-gram not being present). The backoff factor α can, in some implementations, depend on k (i.e., the n-gram order). Examples of techniques for determining variable α values are described below. Alternatively, a single value (e.g., α=0.4) can be specified regardless of n-gram order.

The calculations are recursive for backoff n-grams that are not found until the backoff has reached a unigram. At the unigram level, the score becomes:

$$S(w_i) = \frac{f(w_i)}{N},$$

where N is the size of the training data.

In some alternative implementations, the backoff scores 206 include one or more α values for particular n-gram orders. The specific scores for a particular n-gram are then calculated at run-time in response to an input n-gram using the α value for the n-gram order and the relative frequency of an identified backoff n-gram. Thus, the individual backoff scores are not stored in the language model 200, but instead are generated as needed.

Figure 3:
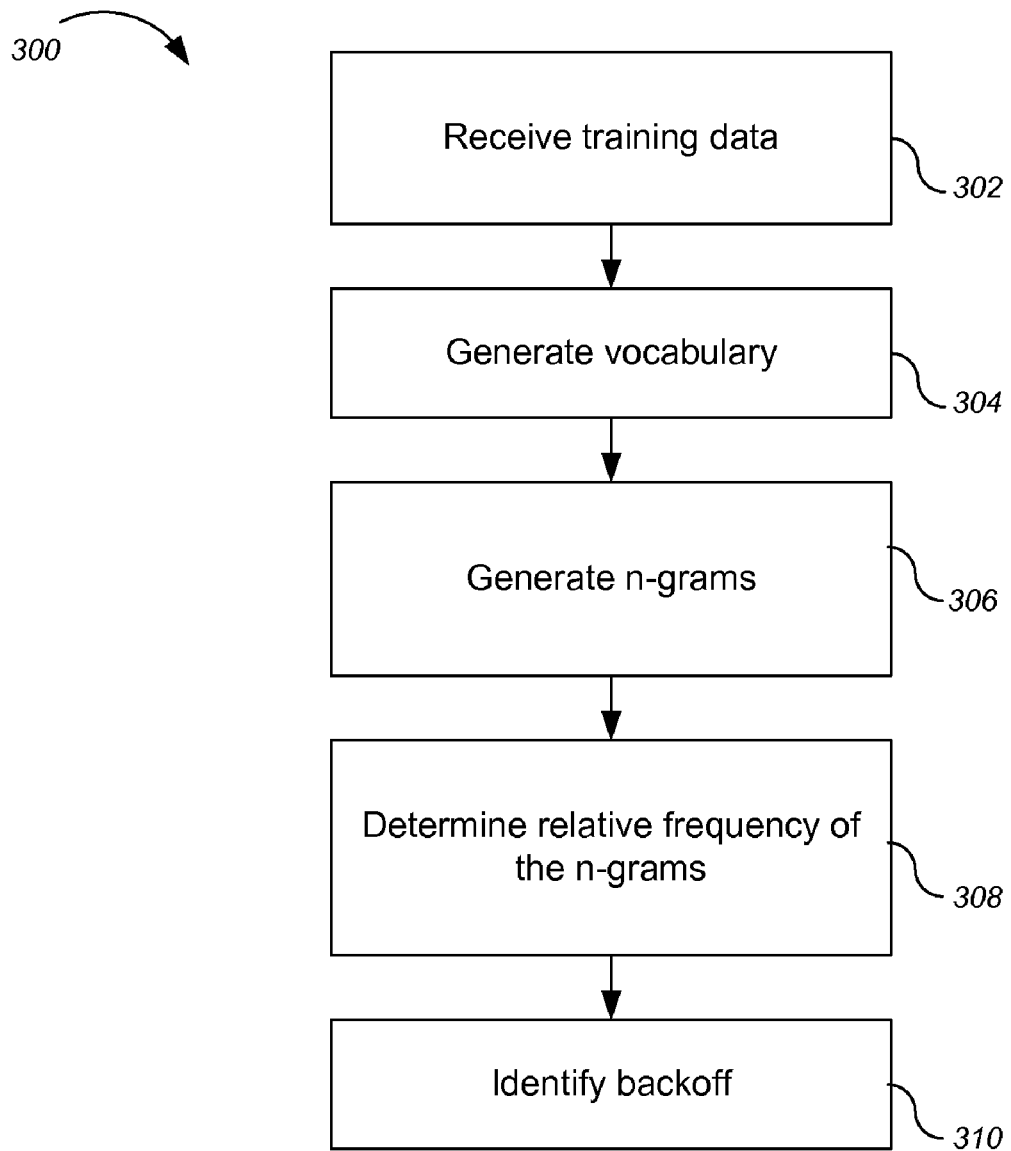
FIG. 3 illustrates a method for generating a language model.

FIG. 3 illustrates a method 300 for generating a language model. For convenience, the method 300 will be described with respect to a system that performs the method 300.

The system receives 302 training data. The training data can be, for example, part or all of the text in a target corpus (e.g., the target corpus 102). In some implementations, an n-gram language model is generated using the identified training data.

Additionally, in some implementations, a distributed training environment is used for large training data (e.g., terabytes of data). One example technique for distributed training is MapReduce. The term MapReduce describes both a programming model and an implementation of the model for processing and generating large data sets. The model and its library implementation will both be referred to as MapReduce. Using MapReduce, programmers specify a map function that processes input (key, value) pairs to generate a set of intermediate (key, value) pairs, and a reduce function that merges all intermediate values associated with the same intermediate key. Programs written in this functional style can automatically be parallelized and executed on a large cluster of commodity computers. The runtime system or framework can be implemented to partition the input data, schedule the program's execution across a set of machines, handle machine failures, and manage the required inter-machine communication.

A MapReduce computation takes a set of input (key, value) pairs, and produces a set of output (key, value) pairs. The user expresses the computation as two functions: Map and Reduce.

Map, written, e.g., by a programmer, takes an input (key, value) pair and produces a set of intermediate (key, value) pairs. The MapReduce library groups together all intermediate values associated with the same intermediate key I and passes them to the Reduce function.

The Reduce function, also written, e.g., by a programmer, accepts an intermediate key I and a set of values for that key. It merges together these values to form a possibly smaller set of values. Typically just zero or one output value is produced for each Reduce invocation. The intermediate values are supplied to the user's reduce function through an iterator. In this way lists of values that are too large to fit in memory can be handled. Additional details of MapReduce are described in J. Dean and S. Ghemawat, *MapReduce: Simplified Data Processing on Large Clusters*, Proceedings of the 6th Symposium on Operating Systems Design and Implementation, pp. 137 150 (Dec. 6, 2004), the contents of which are incorporated here by reference.

Typically, several map tasks operate independently on different processors (e.g., on different computing devices) and on different portions of input data. Similarly, several reduce tasks operate independently on a portion of the intermediate data. The portions of the intermediate data are partitioned according to the intermediate keys so that the same reducer operates on all values for a given intermediate key.

The system generates 304 a vocabulary from the training data. The vocabulary identifies the individual tokens (e.g., words, punctuation) within the training data. MapReduce can be applied to the training data to generate the vocabulary along with a frequency count associated with each token in the vocabulary.

The Map phase takes an input (key, value) pair and produces an intermediate (key, value) pair. In particular, the input (key, value) pairs to the map phase correspond to a key identifying the node and a value that is the text in the node. The intermediate (key, value) pair has a key value corresponding to individual words and a corresponding value for the word. The Reduce phase reduces the intermediate (key, value) pairs having the same key into a single output (key, value). Specifically, the reduce outputs a vocabulary for the words in the training data and their frequencies, (word, frequency).

For example, for three shards S1, S2, and S3, the vocabulary and word frequencies can be generated. Shard S1 includes training data text "a rose". Shard S2 includes the text "is a rose". Shard S3 includes the text "a rose is a rose". During the Map phase, the input for each shard is key=ID and value=sentence. The map output is: key=word and value=1. In particular, the map from S1 produces intermediate (key, value) pairs:
(<S>, 1)
(a, 1)
(rose, 1)
(</S>, 1).

The map from S2 is output as intermediate (key, value) pairs:
(<S>, 1)
(is, 1)
(a, 1)
(rose, 1)
(</S>, 1).

Finally, the map from S3 produces intermediate (key, value) pairs:
(<S>, 1)
(a, 1)
(rose, 1)
(is, 1)
(a, 1)
(rose, 1)
(</S>, 1).

In some implementations, intermediate (key, value) pairs can be optimized before reduce phase by simplifying redundant entries. For example, the intermediate (key, value) pairs from S3 can be optimized to:
(<S>, 1)
(a, 2)
(rose, 2)
(is, 1)
(</s>, 1).

During the Reduce phase, the intermediate (key, value) pairs are combined to produce output (key, value) pairs where the key=word and value=count. The resulting output (key, value) pairs in the example are:
(<s>, 3)
(a, 4)
(is, 2)
(rose, 4)
(</s>, 3).

The results of the Reduce phase provide a vocabulary for the text in the training data as well as the word frequencies. In some implementations, a particular reduce shard is identified for intermediate (key, values) of a particular shard using, for example, a hash function.

The map and reduce functions for generating the vocabulary can be expressed as follows:

```
Map (string key, string value) {
    //key=docid, ignored; value= document
    array words = Tokenize(value);
    for i=1..#words Emit (words[i], "1");}
int ShardForKey (string key, int nshards) {return Hash(key) % nshards;
}
Reduce (string key, iterator values) {
    // key=term; values= counts
    int sum = 0;
    for each v in values
        sum += ParseInt (v);
    Emit (AsString(sum));
}
```

The system generates 306 n-grams using the vocabulary. The vocabulary allows the system to determine every possible combination of vocabulary token up to a maximum n-gram order. The system can be implemented using MapReduce to generate the n-grams and their frequencies within the training data.

The Map phase can process the training data shards in view of the vocabulary. The Reduce phase combines n-grams such that the output (key, value) pairs are (n-gram, frequency) pairs.

For example, three example shards are used to illustrate the n-gram frequency for 2-grams using MapReduce. The example shards are S4, S5, and S6. Shard S4 includes the text "a rose foo". Shard S5 includes the text "is a rose bar" and the shard S6 includes the text "a rose is a rose".

During the Map phase, a map function is applied for the input (key, value) for the node as a function of the vocabulary. The vocabulary in this example is (<s>, </s>, <UNK>, a, is, rose), where <UNK> provides a generic placeholder representing rare words in the training data e.g., "foo". The intermediate (key, value) pairs produced in the map phase have keys equal to 2-grams and a value for the 2-gram. Thus, for S4, the intermediate (key, value) pairs are:
(<s>a, 1)
(a rose, 1)
(rose <UNK>, 1)
(<UNK> </s>, 1).

For S5, the intermediate (key, value) pairs are:
(<s>is, 1)
(is a, 1)
(a rose, 1)
(rose <UNK>, 1)
(<UNK> </s>, 1).

Finally, the intermediate (key, value) pairs for S6 are:
(<s>a, 1)
(a rose, 1)
(rose is, 1)
(is a, 1)
(a rose, 1)
(rose </s>, 1).

During the Reduce phase, the intermediate (key, value) pairs are combined to produce output (key, value) pairs where the keys are the distinct 2-grams and the value is the count for each n-gram: key=2-gram, value=count. The resulting output (key, value) pairs in the example are:
(<s>a, 2)
(<s>is, 1)
(a rose, 3)
(is a, 2)
(rose is, 1)
(rose <UNK>, 2)
(rose </s>, 1)
(<UNK> </s>, 2).

Thus, the results of the Reduce phase provide 2-grams along with their frequencies in the corpus.

The map function for generating the n-grams can be expressed as follows:

```
Map (string key, string value) {
    // key=docid, ignored; value=document
    array ids = ToIds (Tokenize (value));
    for i = 1 .. #ids
        for j = 0 .. maxorder-1
            Emit (ids[i-j .. i], "1");
}
```

The reduce function can be expressed in the same manner as the reduce function for the vocabulary generation.

The system determines 308 relative frequencies for the n-grams. Recall, the relative frequency was defined above as:

$$r(w_i | w_{i-n+1}^{i-1}) = \frac{f(w_{i-n+1}^i)}{f(w_{i-n+1}^{i-1})}.$$

The relative frequency of n-grams in the corpus can also be identified using MapReduce. For example, n-grams can be divided into a number of shards. The input of n-grams and frequencies can be processed in the Map and Reduce phases to produce relative frequencies for the n-grams in a similar manner as describe above.

In particular, a sharding function can be used that places the values need for the numerator and denominator to calculate the relative frequency on the same shard. In particular, a hash function can be applied to the first words of the n-grams. As a result, the required n-grams $w_{i-n+1}^i$ and $w_{i-n+1}^{i-1}$, will share the same first word, $w_{i-n+1}$, and be placed on the same shard (with the exception of all unigrams).

However, in some implementations, sharding using the first word only can result in imbalanced shards. For example, some terms can be found at the beginning of a disproportionate number of n-grams (e.g., stopwords, some punctuation marks, or the beginning of sentence marker). The shards can be more evenly balanced by hashing based on the first two words of the n-grams, for example:

```
Int ShardForKey (string key, int nshards) {
    String prefix = FirstTwoWords (key);
    Return Hash(prefix) % nshards;
}
```

Additionally, the unigram counts are reproduced on each shard in order to calculate relative frequencies within individual shards. However, the data amount is small in comparison to the total number of n-grams.

The system determines 310 backoff scores. The individual shards including all information necessary to calculate the relative frequencies for the n-grams in the shard. Backoff scores are calculated when a full n-gram is not found. Thus, if the relative frequency of the full n-gram is not found, $r(w_i | w_{i-n+1}^{i-1})$, the system recursively looks for the backoff relative frequencies, e.g., $r(w_i | w_{i-n+2}^{i-1})$, $r(w_i | w_{i-n+3}^{i-1})$, etc. until the unigram backoff is reached. Since the n-grams where sharded on their last two words and all unigrams duplicated on each shard, all backoff calculations can be performed within the same shard.

In some implementations, the backoff scores are stored on each shard for the respective backoff n-grams of the shard. Alternatively, the system stores values for the backoff factor α, which are used by individual shards to calculate the particular backoff scores at run-time in response to an input n-gram (e.g., from an input string to be translated).

To summarize, a language model can be generated from a corpus in the following steps. The system generates a vocabulary. Using input text from the corpus, the system outputs a vocabulary of 1-grams and their frequencies. Next, n-grams and their frequencies are identified. The n-grams and their frequencies are identified using the text and vocabulary as input. Relative frequencies for the n-grams are calculated using the n-grams and their respective frequencies. Each step in the process can be implemented using MapReduce as described above. The backoff scores are then determined directly as a function of the relative frequencies of the n-grams.

As stated above, there can be multiple values for the backoff factor α depending on n-gram order. For example, if for particular sample data 4-grams are often used, then the penalty (i.e., α value) for backing off from a 5-gram to a 4-gram should be small. Conversely, if 4-grams are often used within the sample data, then the penalty for backing off from a 4-gram to a 3-gram should be large.

For particular sample data, referred to as heldout data, a count can be obtained as to how many of the n-grams at each order also occur in the language model. One technique for determining multiple backoff factors α in a n-gram language model includes determining the backoff factor as proportional to the counts at each order. For example, for a particular heldout data set, examine all k-grams up to some maximum order n, i. e., for k=1, . . . , n. The coverage of n-grams at order k is calculated as the number of n-gram occurrences of order k in the heldout data that also occur in the language model divided by the total number of n-gram occurrences of order k in the heldout data, i. e., $C_k = L_k / N_k$, where $L_k$ is less than or equal to $N_k$. Additionally, $C_k$ is less than or equal to the coverage at the next lower n-gram order, i.e., $C_k$ is less than or equal to $C_{k-1}$. Given the calculated value of $C_k$, the backoff factor values at each order, $\alpha_k$, are determined as:

$$\alpha_k = 1 - C_k \quad \text{if } k = n \text{ (highest order) and}$$

$$\alpha_k = \frac{(1 - C_k)}{\alpha_{k+1}}, \quad \text{if } k = 1, \ldots, (n-1).$$

Consequently, the $\alpha_k$ values are proportional to the counts at each order. For example, for a set of holdout data and a maximum order of 5, the following backoff factors can be calculated: $\alpha_5 = 0.7012$, $\alpha_4 = 0.6090$, $\alpha_3 = 0.2547$, $\alpha_2 = 0.1052$, and $\alpha_1 = 0.0399$. The notation $\alpha_5$ denotes the backoff factor when backing off from a 5-gram to a 4-gram. In some implementations, there is no backoff from 1-grams to 0-grams, therefore that $\alpha_1$ value is not used.

Another technique slightly adjusts the formulas for calculating the backoff factors as:

$$\alpha_k = 1 - C_k \quad \text{if } k = n \text{ (highest order) and}$$

$$\alpha_k = \frac{(1 - C_k)}{(1 - C_{k+1})} \quad \text{if } k = 1, \ldots, (n-1).$$

The above adjustment results in a slight increase in $\alpha_k$ values for lower order backoffs. For example, using the same holdout data, the backoff factors are calculated as:

$\alpha_5 = 0.7012$, $\alpha_4 = 0.6090$, $\alpha_3 = 0.3632$, and $\alpha_2 = 0.1728$.

In another technique, the formulas for calculating backoff factors provide higher backoff values for higher order backoffs:

$$\alpha_k = (C_{k-1} - C_k)/C_k \quad \text{if } k = n \text{ (highest order)},$$

$$\alpha_k = \frac{(C_{k-1} - C_k)}{(C_k - C_{k+1})} \quad \text{if } k = 2, \ldots, (n-1), \text{ and}$$

$$\alpha_k = \frac{(1 - C_k)}{(C_k - C_{k+1})} \quad \text{if } k = 1.$$

The above formulas adjust the sample $\alpha_k$ values above as follows: $\alpha_5=0.9177$, $\alpha_4=0.9916$, $\alpha_3=0.4719$, $\alpha_2=0.1761$, and $\alpha_1=0.1858$. As above, $\alpha_1$ can be ignored for a given language model.

In some implementations, cap values can be included. The cap values can be introduced to prevent the backoff values from being too large. Therefore, the backoff factors can be capped at some $\alpha_{max}$ such that the backoff value is equal to the minimum of the calculated $\alpha_k$ value or $\alpha_{max}$. For example, in the above sample $\alpha$ values, when an $\alpha_{max}=0.95$ is used, the backoff factor $\alpha_4$ is reduced to the cap value of 0.95 from the calculated value of 0.9916.

In one other technique for calculating backoff factors, a term $M_k$ is introduced. $M_k$ is the sum of the probabilities at order k that are used in the heldout data set. The backoff factors are then calculated such that the total mass of the backed-off distribution at order k is proportional to the probability mass of the heldout set at order k:

$$\alpha_k = M_{k-1}/M_k \text{ if } k=2\ldots n$$

and $$\alpha_k = 0 \text{ if } k=1.$$

Again for the same sample set of holdout data, the above formulas provide the following example backoff values: $\alpha_5=0.5396$, $\alpha_4=0.5138$, $\alpha_3=0.1111$, $\alpha_2=0.0248$, and $\alpha_1=0.0$. As with the previous example, a maximum backoff value, $\alpha_{max}$, can be used to cap the backoff values.

In some implementations, discriminative training can be used to determine the values for one or more backoff factors. Machine translation systems typically use discriminative training techniques to optimize free parameters in order to minimize an automated measure of translation quality, e.g., a Bilingual Evaluation Understudy ("BLEU") score, on some sample data for which a set of reference translations are available. Discriminative training does not attempt to optimize numeric scores directly. Instead, a set of backoff factor values are identified that produce a better translation score than other backoff factor values. BLEU scores are described, for example, in Papineni, K., Roukos, S., Ward, T., and Zhu, W. J. "BLEU: a method for automatic evaluation of machine translation" in *ACL*-2002: 40*th Annual meeting of the Association for Computational Linguistics* pp. 311-318 (2002), which is incorporated by reference.

Specifically, to discriminatively train the backoff factors, a collection of sentences for which translations are available is translated using different values for the backoff factors. The backoff factors that result in a high value of BLEU (or similar) score are used. One example method of discriminatively training features in statistical machine translation is described in Franz Josef Och, *Minimum error rate training in statistical machine translation*, In Proc. of the 41st Annual Meeting of the Association for Computational Linguistics (ACL), pages 160-167 (2003), which is incorporated by reference. The above method can be used to train the backoff factors. The general method takes described in the above reference can be applied to determining backoff factors, by taking as additional "feature functions", the degree of actual backoff encountered when applying the language model at each word position during the translations. The resulting feature function weights are then converted to backoff factors using a log-linear relationship (e.g., a log-linear formulation of a decoding search objective function). The feature functions can be indicator functions for a specific backoff level (e.g., 1 when the language model has backed off exactly k times, and zero otherwise), a step function (e.g., 1 when the language model has backed off at least k times), or other parameterizations.

This specification has been described with reference to machine translations systems. However, the language models and techniques for generating and training language models disclosed can be implemented in other systems using language models including, for example, speech recognition, optical character recognition, character recognition, etc.

Figure 4:
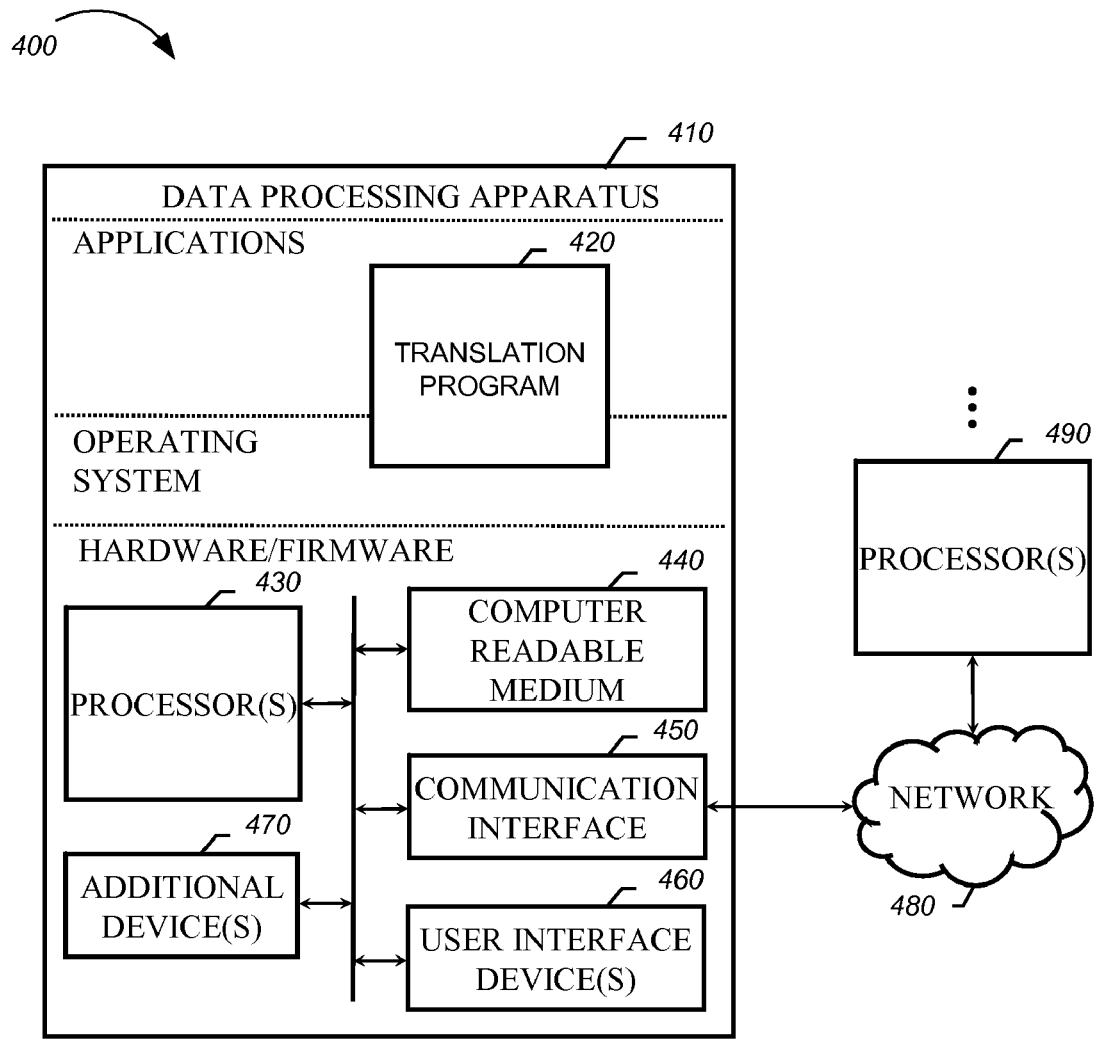
FIG. 4 is an example system for performing translations.

FIG. 4 is an example system for machine translations. A data processing apparatus 410 can include hardware/firmware, an operating system and one or more programs, including translation program 420. The translation program 420 operates, in conjunction with the data processing apparatus 410, to effect the operations described in this specification. Thus, the translation program 420, in combination with one or more processors and computer-readable media (e.g., memory), represents one or more structural components in the system 400.

The translation program 420 can be a translation processing application, or a portion. As used here, an application is a computer program that the user perceives as a distinct computer tool used for a defined purpose. An application can be built entirely into the operating system (OS) of the data processing apparatus 410, or an application can have different components located in different locations (e.g., one portion in the OS or kernel mode, one portion in the user mode, and one portion in a remote server), and an application can be built on a runtime library serving as a software platform of the apparatus 410. Moreover, application processing can be distributed over a network 480 using one or more processors 490. For example, a language model of the translation program 420 can be distributively trained over the one or more processors 490.

The data processing apparatus 410 includes one or more processors 430 and at least one computer-readable medium 440 (e.g., random access memory, storage device, etc.). The data processing apparatus 410 can also include a communication interface 450, one or more user interface devices 460, and one or more additional devices 470. The user interface devices 460 can include display screens, keyboards, mouse, stylus, or any combination thereof.

Once programmed, the data processing apparatus 410 is operable to identify backoff factors as a function of relative n-gram frequency. Additionally, the language model can be generated such that the backoff factors can be derived from a single shard.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A language model system comprising:
one or more computers; and
one or more computer-readable storage devices, coupled to the one or more computers, on which are stored:
a collection of n-grams, and for each n-gram, a corresponding relative frequency, wherein each n-gram is obtained from a corpus and each relative frequency is the relative frequency of the n-gram in the corpus, each n-gram being a sequence of tokens of length k, wherein k is an integer between 1 and a maximum length N, inclusive; and
a set of backoff factors $\alpha_k$, one backoff factor for each value of k from 2 to N, inclusive,
wherein every backoff factor is different from every other backoff factor and every backoff factor is a constant,
wherein for each value of k from 2 to N, the backoff factors define how to compute a score $S_k$ for any n-gram of length k that is not present in the language model, wherein the n-gram of length k that is not present in the language model has a longest backoff n-gram that is present in the language model, and the score $S_k$ is defined in accordance with $$S_k = f \prod_{i=m+1}^{k} \alpha_i,$$

wherein f is the frequency of the longest backoff n-gram present in the language model and m is the length of the longest backoff n-gram present in the language model.

2. The system of claim 1, where the backoff factor at each order comprises a constant penalty value.

3. The system of claim 1, wherein each backoff factor $\alpha_k$ is based on:
a coverage $C_k$ for each value of k, wherein $C_k$ for each value of k is based on a count $L_k$ of n-grams of length k present in the language model that are also present in a collection of heldout data and a total count $N_k$ of n-grams of length k in the heldout data.

4. A method comprising:
generating, at one or more data processing apparatuses, a language model, including:
identifying a collection of n-grams from a corpus of training data, and determining for each n-gram of the collection a corresponding relative frequency of occurrence in the corpus, each n-gram being a sequence of tokens of length k, wherein k is an integer between 1 and a maximum length N; and
determining a set of backoff factors $\alpha_k$, one backoff factor for each value of k from 2 to N,
wherein every backoff factor is different from every other backoff factor and every backoff factor is a constant,
wherein for each value of k from 2 to N, the backoff factors define how to compute a score $S_k$ for any n-gram of length k that is not present in the language model, wherein the n-gram of length k that is not present in the language model has a longest backoff n-gram that is present in the language model, and the score $S_k$ is in accordance with $$S_k = f \prod_{i=m+1}^{k} \alpha_i,$$

wherein f is the frequency of the longest backoff n-gram present in the language model and m is the length of the longest backoff n-gram present in the language model.

5. The method of claim 4, wherein determining the set of backoff factors comprises:
performing discriminative training on a set of sample data, the discriminative training identifying values for the backoff factors that maximize a measure of translation quality.

6. The method of claim 5, where indicator feature functions are used to identify the backoff factors.

7. The method of claim 4, wherein identifying the backoff factors comprises:
calculating a coverage $C_k$ for each value of k, wherein $C_k$ for each value of k is based on a count $L_k$ of n-grams of length k present in the language model that are also present in a collection of heldout data and a total count $N_k$ of n-grams of length k in the heldout data.

8. The method of claim 4, further comprising calculating backoff scores for n-grams using the backoff factors and storing the backoff scores.

9. The method of claim 7, wherein the backoff factor $\alpha_k$ for each value of k is based on:
$1-C_k$, if k is equal to a maximum n-gram length N; and $$\frac{(1-C_k)}{\alpha_{k+1}},$$

if k is less than N.

10. The method of claim 7, wherein the backoff factor at each order k is based on:
$(1-C_k)$, if k is equal to a maximum n-gram length N; and $$\frac{(1-C_k)}{(1-C_{k+1})},$$

if k is less than N.

11. The method of claim 7, wherein the backoff factor at each order k is based on:
$(C_{k-1}-C_k)/C_k$, if k is greater than or equal to a maximum n-gram length N; and $$\frac{(C_{k-1}-C_k)}{(C_k-C_{k+1})},$$

if k is greater than or equal to 2 and less than N.

12. The method of claim 9, wherein each backoff factor $\alpha_k$ does not exceed a maximum value.

13. The method of claim 4, further comprising:
for a collection of heldout data, determining a respective sum $M_k$ of probabilities of n-grams present in the language model that also occur in heldout data for each value of k; and calculating each backoff factor $\alpha_k$ as:

$$\frac{M_{k-1}}{M_k},$$

if k is greater than or equal to 2.

14. A computer program product, encoded on a computer-readable storage device, operable to cause data processing apparatus to perform operations comprising:
generating a language model, including:
identifying a collection of n-grams from a corpus of training data, and determining for each n-gram of the collection a corresponding relative frequency of occurrence in the corpus, each n-gram being a sequence of tokens of length k, wherein k is an integer between 1 and a maximum length N, inclusive; and
determining a set of backoff factors $\alpha_k$, one backoff factor for each value of k from 2 to N,
wherein every backoff factor is different from every other backoff factor and every backoff factor is a constant,
wherein for each value of k from 2 to N, the backoff factors define how to compute a score $S_k$ for any n-gram of length k that is not present in the language model, wherein the n-gram of length k that is not present in the language model has a longest backoff n-gram that is present in the language model, and the score $S_k$ is in accordance with $$S_k = f \prod_{i=m+1}^{k} \alpha_i,$$

wherein f is the frequency of the longest backoff n-gram present in the language model and m is the length of the longest backoff n-gram present in the language model.

15. The computer program product of claim 14, wherein determining the backoff factors comprises:
performing discriminative training on a set of sample data, the discriminative training identifying values for the backoff factors that maximize a measure of translation quality.

16. The computer program product of claim 15, where indicator feature functions are used to identify the backoff factors.

17. The computer program product of claim 14, wherein identifying the backoff factors comprises:
calculating a coverage $C_k$ for each value of k, wherein $C_k$ for each value of k is based on a count $L_k$ of n-grams of length k present in the language model that are also present in a collection of heldout data and a total count $N_k$ of n-grams of length k in the heldout data.

18. The computer program product of claim 14, wherein the operations further comprise calculating backoff scores for n-grams using the backoff factors and storing the backoff scores.

19. A method comprising:
receiving an input string, the input string being divided into one or more n-grams, each n-gram having a length k, wherein k is an integer between 1 and a maximum length N, inclusive;
calculating a score for each n-gram present in a language model, the score being based on a relative frequency of the n-gram in the language model;
obtaining for each n-gram not present in the language model a respective longest backoff n-gram of length m present in the language model and a corresponding relative frequency f for each backoff n-gram present in the language model;
obtaining a set of backoff factors $\alpha_k$, one backoff factor for each value of k from 2 to N, inclusive, wherein every backoff factor is different from every other backoff factor and every backoff factor is a constant; and
calculating, using one or more computing devices, a score $S_k$ for each n-gram not present in the language model by:

$$S_k = f \prod_{i=m+1}^{k} \alpha_i.$$

20. The method of claim 19, where identifying a backoff score includes looking up a calculated backoff score for the n-gram.

21. The method of claim 19, where identifying a backoff score includes calculating the backoff score using the backoff factor for the n-gram and the relative frequency of the backoff n-gram.

22. A computer program product, encoded on a computer-readable storage device, operable to cause data processing apparatus to perform operations comprising:
receiving an input string, the input string being divided into one or more n-grams, each n-gram having a length k, wherein k is an integer between 1 and a maximum length N, inclusive; and
calculating a score for each n-gram present in a language model, the score being based on a relative frequency of the n-gram in the language model;
obtaining for each n-gram not present in the language model a respective longest backoff n-gram of length m present in the language model and a corresponding relative frequency f for each backoff n-gram present in the language model;
obtaining a set of backoff factors $\alpha_k$, one backoff factor for each value of k from 2 to N, inclusive, wherein every backoff factor is different from every other backoff factor and every backoff factor is a constant; and
calculating, using one or more computing devices, a score $S_k$ for each n-gram not present in the language model by:

$$S_k = f \prod_{i=m+1}^{k} \alpha_i.$$

23. The computer program product of claim 22, wherein calculating a score includes looking up a calculated backoff score for the n-gram.

* * * * *

UNITED STATES PATENT AND TRADEMARK OFFICE
CERTIFICATE OF CORRECTION

Page 1 of 1

PATENT NO. : 8,332,207 B2
APPLICATION NO. : 11/767436
DATED : December 11, 2012
INVENTOR(S) : Brants et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1110 days.

Signed and Sealed this
Nineteenth Day of May, 2015

Michelle K. Lee
*Director of the United States Patent and Trademark Office*